United States Patent [19]
Greaves, Jr.

[11] Patent Number: 5,855,418
[45] Date of Patent: Jan. 5, 1999

[54] TRAILER BRAKE DEVICE

[76] Inventor: John C. Greaves, Jr., 190 Wilson Blvd., Naples, Fla. 34120

[21] Appl. No.: 777,788

[22] Filed: Dec. 31, 1996

[51] Int. Cl.$^6$ ..................................................... B60T 13/00
[52] U.S. Cl. ................................................. 303/7; 280/428
[58] Field of Search .................................. 188/112 R, 34; 280/428; 303/7

[56] References Cited

U.S. PATENT DOCUMENTS

| | | | |
|---|---|---|---|
| 3,856,363 | 12/1974 | Kasselmann | 303/7 |
| 4,453,620 | 6/1984 | Angus et al. | 188/112 R |
| 5,013,059 | 5/1991 | Goettker | 280/446.1 |
| 5,213,396 | 5/1993 | Avery et al. | 303/7 |
| 5,246,243 | 9/1993 | Carr | 280/428 |
| 5,342,117 | 8/1994 | Price et al. | 303/3 |
| 5,522,649 | 6/1996 | Stender et al. | 303/7 |
| 5,551,539 | 9/1996 | Frymiare | 188/112 R |

*Primary Examiner*—Robert J. Oberleitner
*Assistant Examiner*—Melanie Torres
*Attorney, Agent, or Firm*—Richard C. Litman

[57] ABSTRACT

The present trailer brake device is a portable, quickly and easily installable and removable assembly which secures to the existing conventional receiver hitch receptacle of a towing vehicle to provide for the attachment of a trailer to the towing vehicle. A telescoping component actuates a hydraulic brake master cylinder when the assembly is compressed, as when the brakes of the towing vehicle are applied and the inertia of the trailer (or towed vehicle) applies a compressive force to the device. The brake master cylinder of the device is connected to the hydraulic brakes of the towed vehicle or trailer, thus automatically actuating them proportionally to the amount of force being applied by the towed vehicle to the brake device. The present device includes adjustment for the initial brake application as well as for the braking force applied to the trailer brakes by the master cylinder, and is quickly and easily adjusted to preclude trailer brake actuation during backing maneuvers. No modifications are required to the towing vehicle for use of the present braking device, and the only modification required of the hydraulic brake equipped towed vehicle or trailer, is a quick release fitting or the like providing for the connection of the present brake device to the hydraulic brake system of the towed vehicle.

20 Claims, 3 Drawing Sheets

TRAILER BRAKE DEVICE

BACKGROUND OF THE INVENTION

1. Field of the Invention

The present invention relates generally to automatic brake actuators for towed vehicles, and more particularly to an automatic hydraulic brake actuator which is integrated with the hitch assembly of a towed vehicle. Forward pressure on the hitch assembly by the towed vehicle (trailer or another vehicle in tow) compresses the assembly, causing a brake master cylinder to be actuated to supply braking pressure to the brakes of the towed vehicle. The device is easily installable and removable, by means of quick disconnect fittings and pins.

2. Description of the Prior Art

The towing of small and lightweight trailers and the like by larger vehicles, is generally done without regard to braking means on the towed vehicle. If the towed vehicle is sufficiently light, very little additional load is placed upon the brakes of the towing vehicle in such circumstances. However, as the size and weight of the towed vehicle increases in proportion to the towing vehicle, brakes for the towed vehicle, in some form or another, are almost universally required.

Accordingly, numerous different types of brakes and brake actuation systems have been developed for trailers and towed vehicles, using electric, hydraulic, pneumatic, and other actuating means for the towed vehicle. Smaller towing vehicles, as well as relatively smaller trailers and the like which are equipped with any braking means at all, are generally equipped with hydraulic brakes as opposed to other operating principles. The use of hydraulic brakes with such vehicles, and particularly in the case of an automobile or other powered vehicle which is being towed on its own wheels, generally precludes the use of any braking system other than hydraulic. Yet, trailer brake systems which are hydraulically connected into the braking system of the towing vehicle are cumbersome and complex, thus leading to the operator sometimes failing to connect the systems. Electric brakes on the towed vehicle provide some means around the above complexity, but require special brakes on the towed vehicle, as well as a reasonably powerful electric power source for the trailer brakes.

The present invention responds to the above problems by tapping into the hydraulic braking system of the towed vehicle, assuming it is so equipped, and relying upon the principle of the inertia of the towed vehicle against the tow hitch or tow bar to actuate the hydraulic brakes of the towed vehicle. Various devices have been developed in the past to actuate the hydraulic brakes of a trailer, but none operate in the manner of the present invention, as will be shown in the following discussion of the prior art of which the present inventor is aware.

U. S. Pat. No. 3,856,363 issued on Dec. 24, 1974 to John T. Kasselmann describes an Adjustable Linkage For Transmitting The Output From A Sensor To A Control Valve. The disclosure is directed to a trailer or towed vehicle braking system which is interconnected with and actuated from the brake system of the towing vehicle. The system is relatively complex, and incorporates vacuum boosted hydraulic brakes in the towed vehicle. Accordingly, both a hydraulic brake line and a vacuum boost line must be connected between the towing vehicle and the trailer brake system. The present system is completely portable and easily installable and removable between the towing and towed vehicles, and does not require any brake line connection between the towing and the towed vehicles, unlike the Kasselmann assembly.

U. S. Pat. No. 4,453,620 issued on Jun. 12, 1984 to William G. Angus et al. describes an Automatic Safety Brake Actuation Tongue For Towed Vehicles. The relatively complex assembly comprises three telescoping tubes with a slide bar within the innermost tube. The device is a permanent component of the trailer tongue, and is not removable from the trailer, whereas the present device is removably securable to the receiver hitch of the towing vehicle. Angus et al. utilize a complex mechanical pushrod linkage to actuate the emergency brakes of the trailer, and in addition generally disclose an internal hydraulic surge brake within the permanently mounted telescoping trailer tongue assembly. Details of the hydraulic brake means are not disclosed.

U. S. Pat. No. 5,013,059 issued on May 7, 1991 to Bernhardt P. Goettker describes an Actuator/Coupler comprising a telescoping trailer tongue arrangement having a specially configured hydraulic brake master cylinder therein. The present invention uses a conventional, "off the shelf" master cylinder, for economy and ease of maintenance. The Goettker assembly is permanently mounted to the trailer or towed vehicle, thus requiring a separate tow bar or tongue assembly for each towed vehicle or trailer. The present invention overcomes this redundancy by providing a single device which is quickly and easily attachable and detachable to the towing vehicle, in the manner of a conventional draw bar and receiver hitch configuration. Hydraulic components of the present invention are readily accessible on the exterior of the device, for simplicity and ease of maintenance. The present device also provides for the lockout of braking action during backing maneuvers, as does the Goettker device, but requires manual reactivation of the braking system when backing is completed. Goettker's device automatically reactivates the automatic braking system when a single backing maneuver is completed, but oftentimes a towed vehicle or trailer must be moved back and forth a few times for optimal positioning. Goettker's device provides no advantage here, as the operator must manually lock out the braking action each time the vehicles are moved forward, or tensile force is applied between towing and towed vehicle, in any backing operation.

U. S. Pat. No. 5,213,396 issued on May 25, 1993 to Larry L. Avery et al. describes a Towed Vehicle Brake Activation Method And Apparatus. The device comprises a hitch ball mounted to the end of a generally vertical bar, which is in turn pivotally secured within a hitch assembly removably attachable to the towing vehicle. The forward rocking or pivoting of the hitch bar due to braking of the towing vehicle, actuates a hydraulic master cylinder which provides hydraulic fluid under pressure to the brakes of the towed vehicle. The present system also attaches removably to the towed vehicle and uses self contained hydraulic braking means, but is considerably more compact with its two telescoping components. The present system has no components which extend significantly below the attached hitch ball or the hitch receiver of the towing vehicle. This is a critical distinction, as relative angular motion between the towing and towed vehicles over uneven terrain can often cause low mounted portions of the hitch assembly to drag on the surface.

U. S. Pat. No. 5,246,243 issued on Sep. 21, 1993 to Larrey Carr describes a Towing Vehicle Mounted Receiver Hitch Actuating A Towed Vehicle's Brake System. The Carr device is a receiver hitch assembly which is permanently mounted to the towing vehicle by an intermediate portion of the assembly in place of the conventional hitch bar receiver. The present device is removably installable to a conventional receiver permanently mounted to the towing vehicle.

Carr also provides no adjustability for initial brake activation, brake pressure, or reverse lockout means, all of which are provided by the present device.

U. S. Pat. No. 5,342,117 issued on Aug. 30, 1994 to Thomas D. Price et al. describes a Brake Pulsing Apparatus adapted for use in a powered vehicle, rather than a towed vehicle or trailer. The system relies upon an inertial switch (pendulum) to actuate braking, and also utilizes a timer relay to actuate and deactivate the brakes rapidly for a pulsing, antilock braking system. The permanently installed apparatus and principles of operation of the Price et al. system are beyond the scope of the present invention. While Price et al. note that their system may incorporate an interconnected relay and/or solenoid to coordinate the pulsing of trailer brakes with the towing vehicle brakes, the system does not utilize inertial forces in the hitch assembly to actuate a brake master cylinder, as in the present invention.

Finally, U. S. Pat. No. 5,522,649 issued on Jun. 4, 1996 to Axel Stender et al. describes a Process And Apparatus For Monitoring A Trialer (sic) Brake For Overload. The apparatus is a complex electromechanical system, using a differential force sensing device to sense longitudinal forces applied between the towing vehicle (tractor) and trailer. This sensor provides a signal to the braking system to modulate the trailer brakes to produce the desired trailer braking force, with the force sensing unit between tractor and trailer continuing to provide feedback during the operation. The present device is completely independent of the brake system of the towing vehicle, and is portable.

None of the above inventions and patents, either singly or in combination, is seen to describe the instant invention as claimed.

SUMMARY OF THE INVENTION

Accordingly, it is a principal object of the invention to provide an improved trailer brake device which provides proportional braking forces to a towed vehicle, depending upon the deceleration of the towing vehicle.

It is another object of the invention to provide an improved trailer brake device which is removably installable to a towing vehicle by means of a conventional tow bar receiver permanently secured to the towing vehicle, and which may be quickly and easily secured to and removed from the towing vehicle and trailer by means of quickly installable an removable attachment pins and quick release fittings.

It is a further object of the invention to provide an improved trailer brake device which includes hydraulic brake actuation means disposed externally of the tow bar structure and parallel thereto, and which includes adjustment means for brake actuation force and for initial brake actuation.

An additional object of the invention is to provide an improved trailer brake device which adjustment means also provides for the locking out of trailer brake actuation during backing.

It is an object of the invention to provide improved elements and arrangements thereof in an apparatus for the purposes described which is inexpensive, dependable and fully effective in accomplishing its intended purposes.

These and other purposes are accomplished by the present invention by providing a trailer brake device which is a portable, quickly and easily installable and removable assembly, able to be secured to the existing conventional receiver hitch receptacle of a towing vehicle to provide for the attachment of a trailer to the towing vehicle. A telescoping component actuates a hydraulic brake master cylinder when the assembly is compressed, as when the brakes of the towing vehicle are applied and the inertia of the trailer (or towed vehicle) applies a compressive force to the device. The brake master cylinder of the device is connected to the hydraulic brakes of the towed vehicle or trailer, thus automatically actuating them proportionally to the amount of force being applied by the towed vehicle to the brake device. The present device includes adjustment for the initial brake application as well as for the braking force applied to the trailer brakes by the master cylinder, and is quickly and easily adjusted to preclude trailer brake actuation during backing maneuvers. No modifications are required to the towing vehicle for use of the present braking device, and the only modification required of the hydraulic brake equipped towed vehicle or trailer, is a quick release fitting or the like providing for the connection of the present brake device to the hydraulic brake system of the towed vehicle.

The stated and other objects of the invention will become readily apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 3:
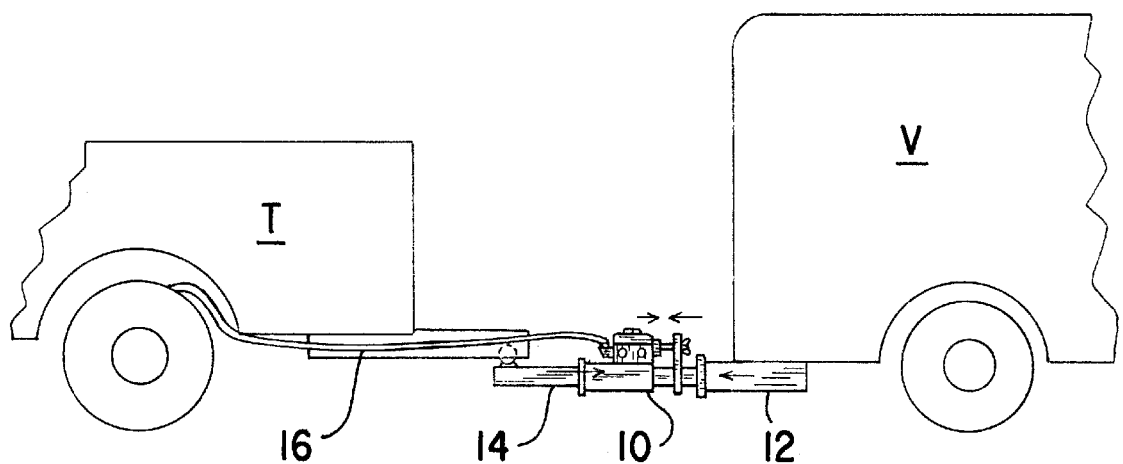
FIG. 3 is a partially fragmented, environmental, side elevation view of the present trailer brake device, a towing vehicle and a trailer in use.

The present invention comprises a trailer brake device 10, shown in operative position in the environmental view of FIG. 3. The device 10 is a relatively economical and elegant apparatus providing proportional braking force for a towed vehicle or trailer T which is equipped with conventional hydraulic brakes, and is quickly and easily installable to and removable from a conventional receiver hitch receptacle 12 of a towing vehicle V. In turn, the device 10 provides for the removable attachment of a towed vehicle or trailer T thereto by means of a conventional trailer hitch bar 14, as shown in FIG. 3. Communication with the brake system of the towed vehicle T is by means of a quickly attachable and removable brake line 16.

Figure 1:
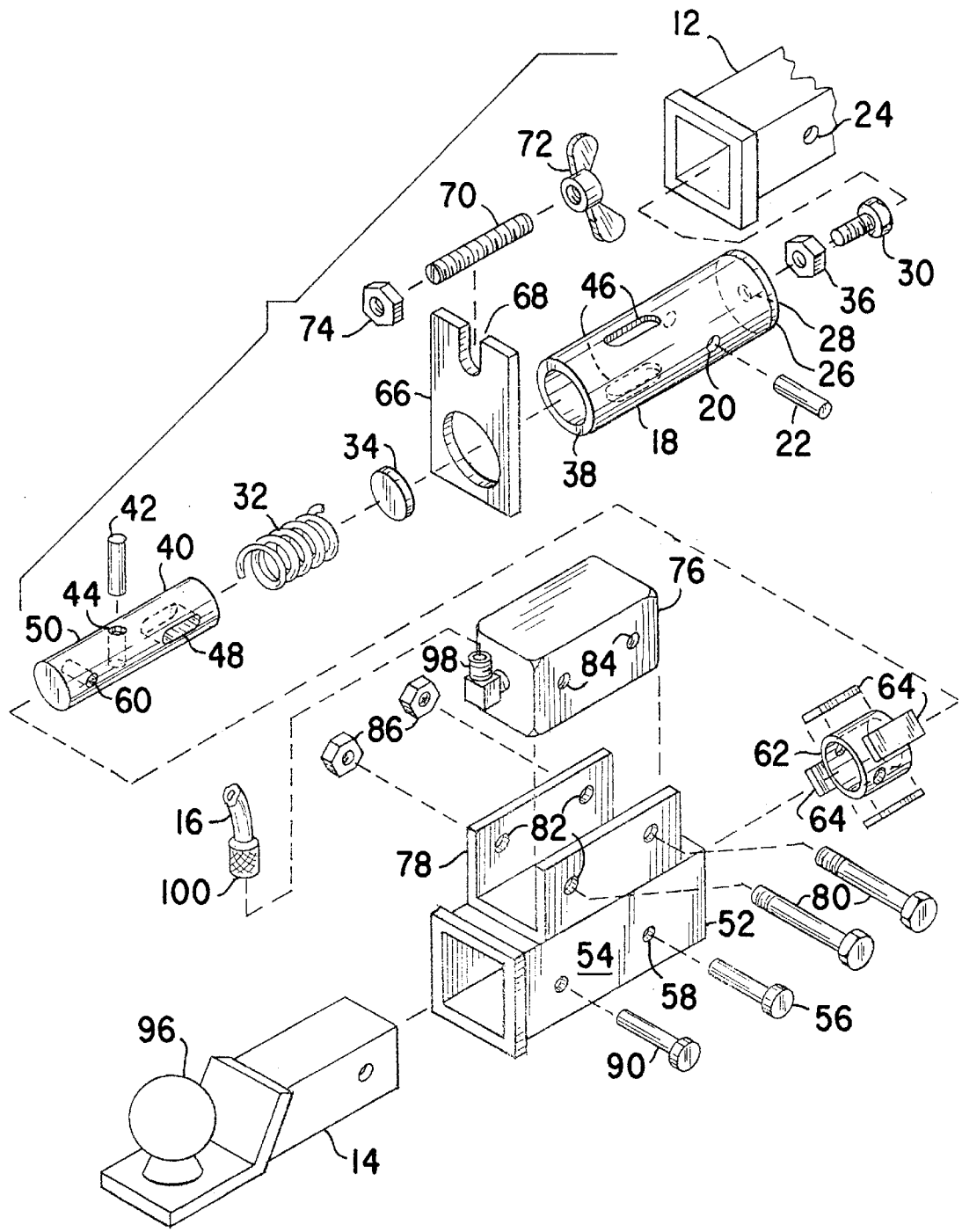
FIG. 1 is an exploded perspective view of the components of the structure comprising the present trailer brake device, showing various details thereof.

FIG. 1 provides an exploded perspective view of the various components of the present trailer brake device 10, including the receiver hitch receptacle 12 (which is understood to be normally permanently secured to the towing vehicle V) and the towed vehicle or trailer hitch bar 14 (which is conventionally removably inserted into the receiver hitch receptacle 12 of the towing vehicle V). These components comprising the brake device 10, hitch receptacle 12, and hitch bar 14 comprise a vehicle towing assembly, which provides automatic and proportional braking force for the towed vehicle T having a conventional hydraulic brake system, with braking force provided to the towed vehicle T being proportional to the decelerative force developed by the towing vehicle V.

The trailer brake device 10 comprises a cylindrical forward sleeve 18, which is adapted for removable installation within the conventional rectangular receiver hitch receptacle 12 of the towing vehicle V. The sleeve 18 has a lateral passage 20 therethrough, which provides for the removable insertion of a lateral pin 22 therethrough to secure the sleeve 18 (and the remainder of the trailer brake device 10 from which the sleeve 18 extends) to the hitch receptacle 12, by means of the conventional lateral hole 24 therethrough.

The sleeve 18 has a closed forward end 26, through which a threaded hole 28 is formed for the adjustable installation of a cooperatingly threaded bolt 30 therein. This bolt 30 provides adjustable pressure on a compressive spring 32 by means of a disc 34; a nut 36 is provided to lock the adjustment of the bolt 30.

The opposite, rearward end 38 of the sleeve 18 is open, and provides for the slidable installation of an arbor 40 therein. The arbor 40 is captured within the sleeve 18 by a vertically disposed pin 42, which fits through a vertical hole 44 through the solid cylindrical arbor 40. The pin 42 extends from the sides of the arbor 40, and is captured in slots 46 in the upper and lower sides of the sleeve 18. The arbor 40 also has a more forwardly disposed lateral slot 48 therethrough, through which the lateral pin 22 passes. Thus, the arbor 40 cannot rotate relative to the sleeve 18 due to the two pins 22 and 42 which ride in the respective slots 48 and 46. Yet, the arbor 40 may move longitudinally within the rear portion of the sleeve 18, to the limits defined by the slots 46 and 48. The compressive spring 32 is captured within the forward portion of the sleeve 18, between the arbor 40 and the closed forward end 26 of the sleeve 18, or more specifically, the disc 34 which provides for the adjustment of the compressive force of the spring 32 against the arbor 40 by means of the adjustment bolt 30.

The rearward portion 50 of the arbor 40 is immovably secured within the forward portion 52 of a trailer hitch bar receptacle 54, by a lateral pin 56 which passes through lateral holes 58 in the hitch bar receptacle 54 and through a lateral passage 60 in the rearward portion 50 of the arbor 40. An additional sleeve or spacer 62 is provided between the rearward portion 50 of the arbor 40 and the forward portion 52 of the hitch bar 54, and diagonally disposed shims 64 may be provided to limit relative rotary motion between the arbor 40 and hitch bar receptacle 54.

The rearward end 38 of the sleeve 18 includes a brake master cylinder actuator affixed thereto, comprising an actuator support plate 66 which is welded or otherwise secured normal to the major axis of the sleeve 18 to extend upwardly from the rearward end 38 of the sleeve 18. The support plate 66 includes a slot 68 formed therein, with the slot 68 providing for the adjustable installation of a threaded brake actuation rod 70 therein. The rod 70 may be adjustably (and removably) secured within the slot 68 by a wing nut 72 and opposite lock nut 74, with the rod 70 being oriented parallel to and above the longitudinal axis of the sleeve 18.

The upper side of the trailer hitch bar receptacle 54 has a conventional hydraulic brake master cylinder 76 affixed thereabove, vertically offset from the longitudinal axis of the hitch bar receptacle 54. A generally U-shaped channel or cradle 78 is affixed to the upper surface of the hitch bar receptacle 54, with the master cylinder 76 being secured within the cradle 78 by a pair of bolts 80 which are inserted through holes 82 in the sides of the cradle 78 and cooperating lateral passages 84 through the block of the master cylinder 76. The bolts may in turn be secured by nuts 86, or other suitable means.

Figure 2:
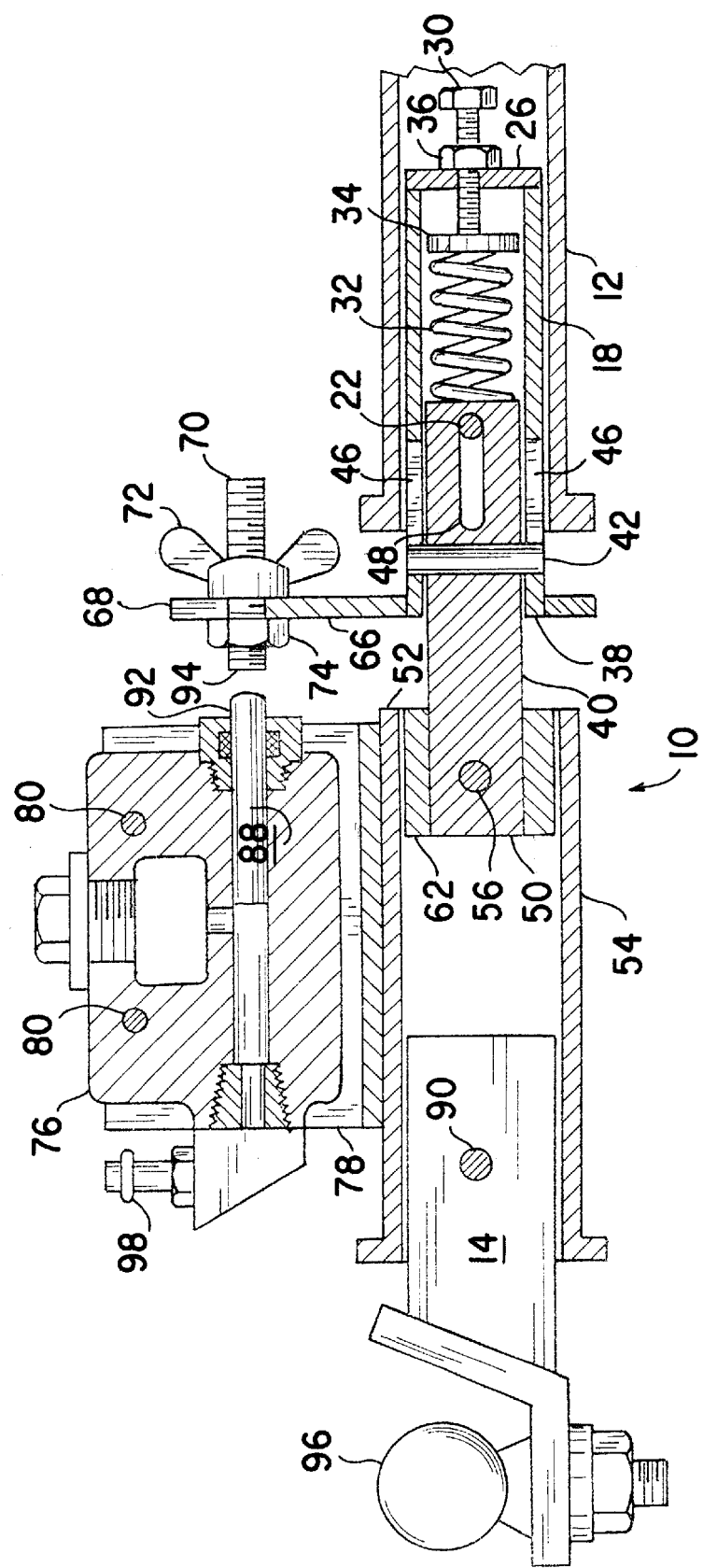
FIG. 2 is a side elevation view in section of the present trailer brake device, showing the interrelationship of the components and further details.

The brake master cylinder 76 includes a piston 88 therein, as shown in FIG. 2. The master cylinder 76 installation is located to position the longitudinal axis of the piston 88 generally in alignment with the longitudinal axis of the brake actuator rod 70, as shown in FIG. 2. This allows the rod 70 to operate the brake master cylinder 76 during vehicle braking, as explained below.

The above described components are assembled to form the trailer brake device 10, shown in section in FIG. 2. The towing vehicle receiver hitch receptacle 12 is normally permanently affixed to the towing vehicle V, with the sleeve 18 of the brake device 10 removably secured therein by the lateral pin 22, in a similar manner to that used for the removable attachment of a trailer hitch bar, such as the trailer hitch bar 14, within the hitch receptacle 12. Although the sleeve 18 is cylindrical and the interior of the conventional hitch receptacle 12 is rectangular or square, it will be seen that the sleeve 18 is restricted from rotational movement relative to the hitch receptacle 12 due to the lateral pin 22 passing through both. Also, the sleeve 18 is longitudinally fixed within the hitch receptacle 12 and does not move relative to the hitch receptacle 12 when installed therein. It will further be seen that the brake master cylinder actuator assembly cannot move relative to the hitch receptacle 12, due to the actuator support plate being immovably secured to the rearward end 38 of the sleeve 18.

Working from the rearward or trailer hitch end of the assembly, the trailer hitch bar receptacle 54 provides for the removable installation of a conventional rectangular section trailer hitch bar 14 therein, in a similar manner to the installation of such a hitch bar in a conventional rectangular receiver hitch receptacle. The hitch bar 14 cannot move relative to the hitch bar receptacle 54, due to the lateral pin 90 which passes through the hitch bar 14 and hitch bar receptacle 54.

The forward portion 52 of the hitch bar receptacle 54 is immovably affixed to the rearward portion 50 of the arbor 40, using the sleeve 62 and shim 64 arrangement discussed above to secure the cylindrical cross section of the solid bar stock arbor 40 within the rectangular or square section interior of the hitch bar receptacle 54. The shims fit into the diagonal corners of the hitch bar receptacle 54 to eliminate any significant relative play, with the arbor 40 being immovably secured relative to the hitch bar receptacle 54 by the lateral pin 56. The brake master cylinder 76 is immovably affixed to the upper side of the hitch bar receptacle 54 by the cradle or channel 78. Thus, the components comprising the assembly of the arbor 40, hitch bar receptacle 54, towed vehicle hitch bar 14, and brake master cylinder 76, are each immovably affixed relative to one another.

In a similar manner, the components comprising the assembly of the towing vehicle receiver hitch receptacle 12, sleeve 18, and brake actuator support plate 66, are also each immovably affixed relative to one another. However, the arbor 40 is free to move longitudinally within the sleeve 18 due to the slots 46 in the walls of the sleeve 18 and the slot 48 through the arbor 40. Relative rotational movement between the arbor 40 and the sleeve 18 is precluded, however, due to the pins 22/42 riding within the slots 48/46. Accordingly, while the rearward assembly of the hitch bar 14, receptacle 54, arbor 40, and brake master cylinder 76 can move longitudinally relative to the forward assembly of the sleeve 18 and hitch receptacle 12, relative rotational movement is precluded.

When the present trailer brake device 10 is connected between a towing vehicle V and a towed vehicle or trailer T, there will be a tensile force applied along the device 10 due to the normal drag of the tires, bearings, and aerodynamic drag of the towed vehicle T. However, when the brakes of the towing vehicle V are applied, the inertia of the towed vehicle T will cause the towed vehicle T to attempt to overrun the towing vehicle V, thus producing a compressive force along the length of the trailer brake device 10. This causes the arbor 40 to move longitudinally within the sleeve 18, restrained only by the compression of the spring 32 (and under extreme conditions, the limits of the slots 46 and 48).

As the arbor 40 advances within the sleeve 18, the brake master cylinder 76, with its piston 88, will also advance toward the brake actuator rod 70, held in position by the support plate 66 extending upwardly from the rearward end 38 of the sleeve 18. When the forward end 92 of the master cylinder piston 88 contacts the brake actuator rod 70, the piston 88 is forced rearwardly within the master cylinder 76, thereby producing hydraulic pressure in the cylinder 76 and through the brake line 16 (FIGS. 1 and 3) to the conventional brake system (not shown) of the towed vehicle T, thus causing the brakes of the towed vehicle T to be applied. Once the brakes of the towing vehicle V have been released, the drag of the towed vehicle T will cause the arbor 40 to draw back from the sleeve 18, thereby causing the master cylinder 76 and its brake piston 88 to withdraw from the actuator rod 70 to release hydraulic pressure in the brake system of the towed vehicle T.

The above described trailer brake device provides proportional braking to the towed vehicle or trailer T, as the harder the brakes are applied in the towing vehicle V, the greater the compressive force of the arbor 40 against the spring 32, and the greater braking force the actuator rod 70 applies to the brake master cylinder piston 88. This force is adjustable, by means of the brake force adjustment bolt 30 through the closed forward end 26 of the sleeve 18. Adjustment is easily made by removing the lateral pin 22 from the towing vehicle receiver hitch receptacle 12, and removing the sleeve 18 from the receptacle 12 to expose the bolt 30 and its locking nut 36. The locking nut 36 is loosened, and the bolt 30 is turned clockwise to compress the spring 32 further in order to reduce trailer braking force relative to towing vehicle braking force, and counterclockwise to reduce spring 32 compression to increase trailer braking force.

The present trailer braking device 10 also provides for the adjustment of the initiation of trailer braking, by means of the adjustable brake actuator rod 70 secured within the slot 68 of the actuator rod support plate 66. If more immediate trailer braking is desired when the towing vehicle V brakes are applied, the threaded actuator rod 70 is adjusted so its contact end 94 is positioned more closely to the forward end 92 of the master cylinder brake piston 88. Towed vehicle T braking action may be delayed by adjusting the actuator rod 70 further forward, to provide a larger gap between the contact end 94 thereof and the forward end 92 of the piston 88 when the brakes are not applied.

It will be seen that during backing maneuvers, the towing vehicle V will tend to apply a compressive force on the trailer brake device 10, due to pushing the towed vehicle T rather than applying the normal pulling or tensile force. This would cause the brakes of the towed vehicle T to be applied, when it may not be desired that they be applied. This problem is easily overcome by merely loosening the wing nut 72 of the brake actuator rod 70, and removing the actuator rod 70 from the slot 68 (or repositioning the rod 70 within the slot 68 so the contact end 94 of the rod 70 is no longer aligned with the brake master cylinder piston 88). When the actuator rod 70 is so adjusted, no contact is made between the rod 70 and the master cylinder piston 88, and thus the brakes of the towed vehicle T are not applied, regardless of the compressive force applied through the braking device 10.

In summary, the present trailer brake device 10 provides a most useful accessory for persons who have occasion to tow a large or heavy trailer or other vehicle with conventional hydraulic brakes. The brake device 10 may be used with a conventional trailer hitch bar 12 and ball 96, or may be used with other towing apparatus which is adaptable to a conventional receiver hitch receptacle, to fit the hitch bar receptacle 54 of the device 10. No modifications are required to the towing vehicle V to use the present device 10, as the device 10 is quickly and easily installable within and removable from a conventional receiver hitch receptacle using only a single pin, e.g., pin 22. (Clevis pins, e.g., pins 56/90, and hitch pins, not shown, may be used.)

The trailer hitch bar 14 is also quickly and easily installed within and removed from the hitch bar receptacle 54, in the same manner as that used to secure and remove the device 10 to and from the receiver hitch receptacle 12 of the towing vehicle V. The only other connection required is to secure the brake line 16 to the output 98 of the brake master cylinder 76, which connection may be made by means of a quick disconnect fitting 100 (FIG. 1) and an appropriate fitting at the output 98 of the master cylinder 76.

The brake system of the towed vehicle T is easily configured to use the present braking device 10, by merely tapping into the main brake line, adjacent the brake master cylinder of the towed vehicle T. There are generally various tees and fittings in this area, providing easy disassembly for the installation of a tee with a quick disconnect fitting for the towed vehicle end of the brake line 16. Alternatively, the brake line 16 may provide for quick disconnection at the front of the towed vehicle T, with the line 16 being left connected to the master cylinder 76 at the output 98.

The positioning of the brake master cylinder 76, and the actuator rod support plate 66, above the remainder of the assembly, assures that these components will remain clear of the underlying terrain when the towing vehicle V and towed vehicle T crest a slight rise, whereupon the hitch assembly of the two vehicles becomes the low point of the assembly. Further, the placement of these brake components above the remainder of the assembly, and parallel thereto, provides easy access for adjustment and maintenance as required.

Accordingly, the present trailer brake device 10 provides a most elegant solution to the problem of providing braking action to a towed vehicle equipped with hydraulic brakes. The device 10 is sturdy and durable, and as it is easily transferrable between different towing vehicles V and towed vehicles T, it will provide a most economical and long lasting tool for such towing operations.

It is to be understood that the present invention is not limited to the sole embodiments described above, but encompasses any and all embodiments within the scope of the following claims.

I claim:

1. A trailer brake device removably installable between a towing vehicle and a towed vehicle, said device comprising:

a sleeve including a lateral passage therethrough providing for the removable attachment of said brake device to a receiver hitch receptacle of the towing vehicle, with said sleeve having a rearward end with a brake master cylinder actuator affixed thereto;

an arbor slidably contained within said sleeve, with said sleeve having a closed forward end and open rearward end, with a compressive spring disposed between said sleeve forward end and said arbor urging said arbor outwardly toward said open rearward end of said sleeve;

said arbor having a rearward portion with a trailer hitch bar receptacle affixed thereto, with said trailer hitch bar receptacle including a lateral passage therethrough providing for the removable installation of a trailer hitch bar therein and including a brake master cylinder installed thereon;

said brake master cylinder including a piston therein, with said piston being axially aligned with said brake master cylinder actuator of said sleeve and with said piston having a forward end adjacent said brake master cylinder actuator, and;

a quickly removable brake line extending from said brake master cylinder to a conventional hydraulic brake system of the towed vehicle, with compressive force applied to said trailer brake device by the towed vehicle during braking of the towing vehicle, serving to actuate said brake master cylinder by said piston of said brake master cylinder being forced against said actuator to produce hydraulic pressure to the towed vehicle brake system by said brake line.

2. The trailer brake device according to claim 1, wherein:

said device is quickly and easily installable and removable from the towing vehicle by at least one lateral pin removably installable through the receiver hitch receptacle of the towing vehicle and said sleeve, said brake line is quickly and easily installable and removable from said brake master cylinder of said device by cooperating quick release fittings on said master cylinder and on said brake line, and the trailer hitch bar is quickly and easily removable from said hitch bar receptacle by at least one lateral pin removably installable through said hitch bar receptacle and the trailer hitch bar.

3. The trailer brake device according to claim 1, wherein:

said brake master cylinder and said brake master cylinder actuator are each vertically offset respectively above said trailer hitch bar receptacle and said sleeve.

4. The trailer brake device according to claim 1, including:

trailer brake force adjustment means.

5. The trailer brake device according to claim 4, wherein:

said trailer brake force adjustment means comprises a threaded bolt adjustably installed in a cooperatingly threaded hole through said closed forward end of said sleeve, with said bolt adjustably bearing upon said spring within said sleeve to provide for the adjustment of compressive force thereto.

6. The trailer brake device according to claim 1, including:

trailer brake initiation adjustment means.

7. The trailer brake device according to claim 6, wherein:

said trailer brake initiation adjustment means is provided by said brake master cylinder actuator, with said actuator comprising an actuator support plate extending from said sleeve, and said support plate including a threaded rod adjustably disposed therethrough to bear adjustably against said piston of said brake master cylinder during braking operations.

8. The trailer brake device according to claim 1, including:

means providing for the lockout of trailer brake function during backing operations.

9. The trailer brake device according to claim 8, wherein:

said trailer brake lockout means is provided by said brake master cylinder actuator, with said actuator comprising an actuator support plate extending from said sleeve, and said support plate including a slot formed therein with a threaded rod removably disposed within said slot, with said threaded rod bearing against said piston of said brake master cylinder during braking operations when said rod is installed within said slot of said support plate and precluding actuation of said brake master cylinder when said threaded rod is removed from said slot of said support plate.

10. The trailer brake device according to claim 1, wherein:

said sleeve comprises a round cylinder rotationally affixed removably within the towing vehicle receiver hitch receptacle by a removable lateral pin therethrough;

said arbor comprises a solid cylindrical rod rotationally affixed within said sleeve by said lateral pin through said hitch receptacle and said sleeve;

said hitch bar receptacle comprises a rectangular tube rotationally affixed to said arbor by a cylindrical sleeve secured therebetween by a lateral pin, with said sleeve including a plurality of diagonal shims disposed between said cylindrical sleeve and said rectangular hitch bar receptacle, and;

said hitch bar receptacle having the trailer hitch bar rotationally affixed thereto by a removable lateral pin through the trailer hitch bar and through said rearward portion of said receptacle.

11. A vehicle towing assembly, comprising in combination:

a towing vehicle receiver hitch receptacle permanently installed to a towing vehicle;

a towed vehicle hitch bar providing for the removable attachment of a towed vehicle thereto, and;

a trailer brake device removably installable to said receiver hitch receptacle of the towing vehicle and to said towed vehicle hitch bar, with said trailer brake device comprising;

a sleeve including a lateral passage therethrough providing for the removable attachment of said brake device to said receiver hitch receptacle of the towing vehicle, with said sleeve having a rearward end with a brake master cylinder actuator affixed thereto;

an arbor slidably contained within said sleeve, with said sleeve having a closed forward end and open rearward end, with a compressive spring disposed between said sleeve forward end and said arbor urging said arbor outwardly toward said open rearward end of said sleeve;

said arbor having a rearward portion with a trailer hitch bar receptacle affixed thereto, with said trailer hitch bar receptacle including a lateral passage therethrough providing for the removable installation of said trailer hitch bar therein and including a brake master cylinder installed thereon;

said brake master cylinder including a piston therein, with said piston being axially aligned with said brake master cylinder actuator of said sleeve and with said piston having a forward end adjacent said brake master cylinder actuator, and;

a quickly removable brake line extending from said brake master cylinder to a conventional hydraulic brake system of the towed vehicle, with compressive force applied to said trailer brake device by the towed vehicle during braking of the towing vehicle, serving to actuate said brake master cylinder by said piston of said brake master cylinder being forced against said actuator to produce hydraulic pressure to the towed vehicle brake system by said brake line.

12. The vehicle towing assembly according to claim 11, wherein:

said trailer brake device is quickly and easily installable and removable from the towing vehicle by at least one lateral pin removably installable through said receiver hitch receptacle of the towing vehicle and said sleeve, said brake line is quickly and easily installable and removable from said brake master cylinder of said trailer brake device by cooperating quick release fittings on said master cylinder and on said brake line, and said trailer hitch bar is quickly and easily removable from said hitch bar receptacle of said trailer brake device by at least one lateral pin removably installable through said hitch bar receptacle of said trailer brake device and said trailer hitch bar.

13. The vehicle towing assembly according to claim 11, wherein:

said brake master cylinder and said brake master cylinder actuator are each vertically offset respectively above said trailer hitch bar receptacle and said sleeve of said trailer brake device.

14. The vehicle towing assembly according to claim 11, including:

trailer brake force adjustment means.

15. The vehicle towing assembly according to claim 14, wherein:

said trailer brake force adjustment means comprises a threaded bolt adjustably installed in a cooperatingly threaded hole through said closed forward end of said sleeve of said trailer brake device, with said bolt adjustably bearing upon said spring within said sleeve to provide for the adjustment of compressive force thereto.

16. The vehicle towing assembly according to claim 11, including:

trailer brake initiation adjustment means.

17. The vehicle towing assembly according to claim 16, wherein:

said trailer brake initiation adjustment means is provided by said brake master cylinder actuator of said trailer brake device, with said actuator comprising an actuator support plate extending from said sleeve, and said support plate including a threaded rod adjustably disposed therethrough to bear adjustably against said piston of said brake master cylinder of said trailer brake device during braking operations.

18. The vehicle towing assembly according to claim 11, including:

means providing for the lockout of trailer brake function during backing operations.

19. The vehicle towing assembly according to claim 18, wherein:

said trailer brake lockout means is provided by said brake master cylinder actuator, with said actuator comprising an actuator support plate extending from said sleeve, and said support plate including a slot formed therein with a threaded rod removably disposed within said slot, with said threaded rod bearing against said piston of said brake master cylinder during braking operations when said rod is installed within said slot of said support plate and precluding actuation of said brake master cylinder when said threaded rod is removed from said slot of said support plate.

20. The vehicle towing assembly according to claim 11, wherein:

said sleeve of said trailer brake device comprises a round cylinder rotationally affixed removably within said towing vehicle receiver hitch receptacle by a removable lateral pin therethrough;

said arbor of said trailer brake device comprises a solid cylindrical rod rotationally affixed within said sleeve by said lateral pin through said hitch receptacle and said sleeve;

said hitch bar receptacle of said trailer brake device is a rectangular tube rotationally fixed to said arbor by a cylindrical sleeve secured therebetween by a lateral pin, with said sleeve including a plurality of diagonal shims disposed between said cylindrical sleeve and said rectangular hitch bar receptacle, and;

said hitch bar receptacle having said trailer hitch bar rotationally affixed thereto by a removable lateral pin through said hitch bar and through said rearward portion of said receptacle.

* * * * *